Feb. 17, 1970  E. E. HAWKE ET AL  3,495,857
UNIVERSALLY ADJUSTABLE COUPLINGS
Filed April 12, 1968  10 Sheets-Sheet 1
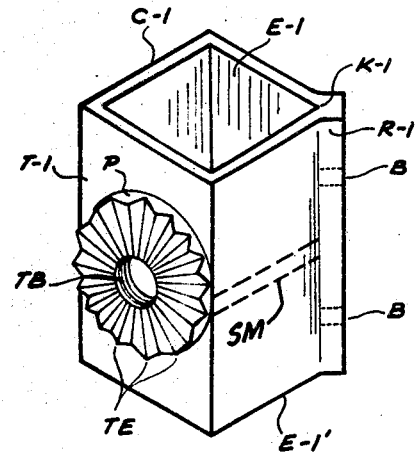
FIG. 1
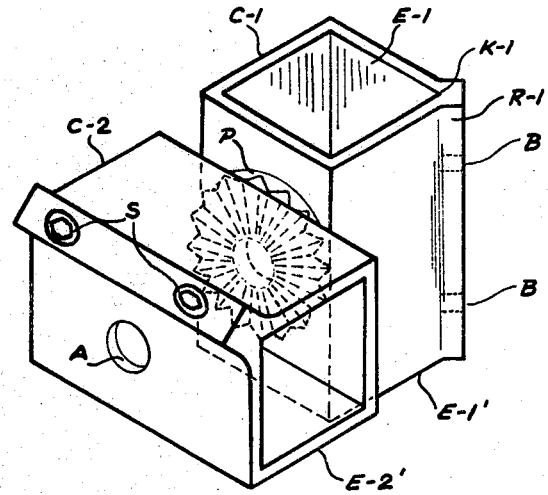
FIG. 3
FIG. 2
INVENTORS
EUGENE E. HAWKE
WILLIAM A. D. MACKIE

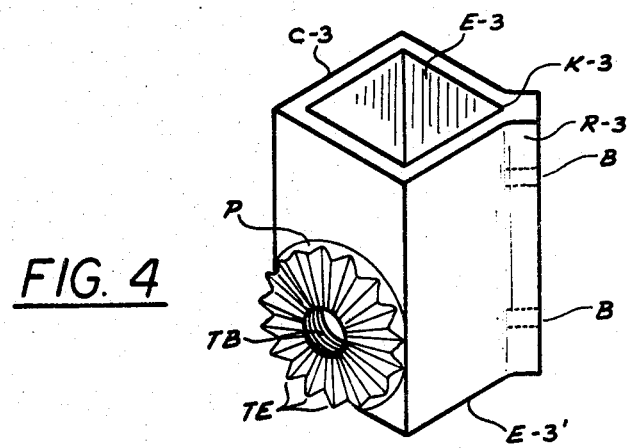
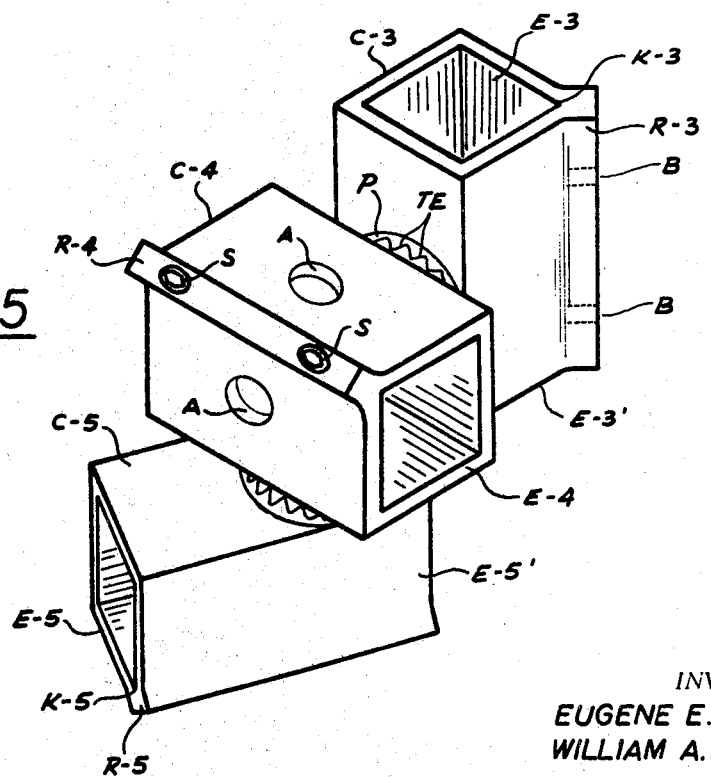

Feb. 17, 1970   E. E. HAWKE ET AL   3,495,857
UNIVERSALLY ADJUSTABLE COUPLINGS
Filed April 12, 1968   10 Sheets-Sheet 4

INVENTORS
EUGENE E. HAWKE
WILLIAM A.D. MACKIE

INVENTORS
EUGENE E. HAWKE
WILLIAM A.D. MACKIE

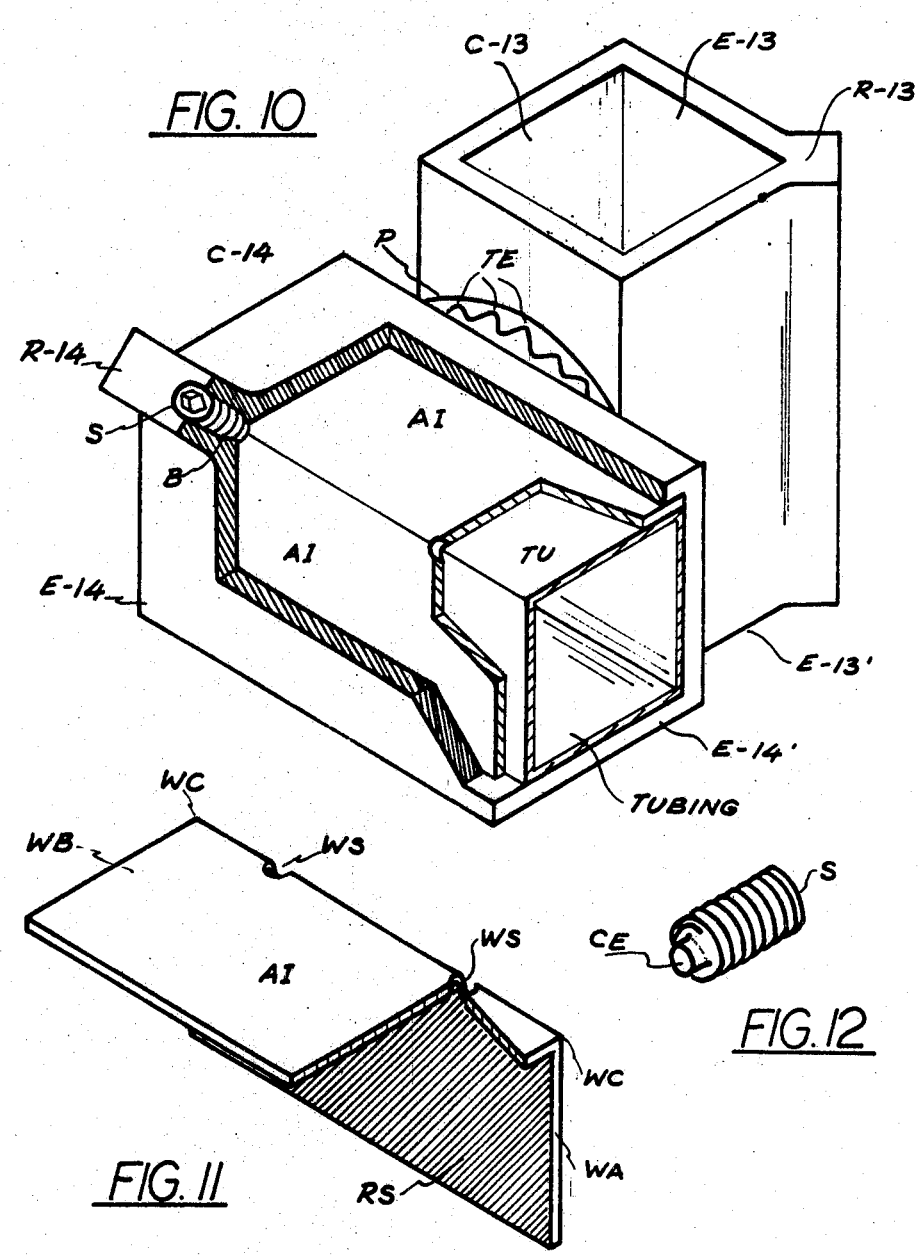

INVENTORS
EUGENE E. HAWKE
WILLIAM A.D. MACKIE

INVENTORS
EUGENE E. HAWKE
WILLIAM A.D. MACKIE

INVENTORS
EUGENE E. HAWKE
WILLIAM A.D. MACKIE

INVENTORS
EUGENE E. HAWKE
WILLIAM A.D. MACKIE

United States Patent Office 3,495,857
Patented Feb. 17, 1970

3,495,857
UNIVERSALLY ADJUSTABLE COUPLINGS
Eugene E. Hawke, 14 Lonsdale Road, Toronto 7, Ontario, Canada, and William A. D. Mackie, Toronto, Ontario, Canada; said Mackie assignor to said Hawke
Filed Apr. 12, 1968, Ser. No. 722,526
Int. Cl. E04g 7/00; F16b 7/00
U.S. Cl. 287—54                                    9 Claims

ABSTRACT OF THE DISCLOSURE

These adjustable couplings comprise a plurality of components having a novel construction including the provision of mating means capable of universal adjustment and also the provision of a rugged, strongly reinforced ridge or rib extending diagonally from one corner of each component of the coupling. The strong diagonal ridge or rib is provided with a plurality of screw holes or threaded bores having sufficient number of threads to give a strong holding power. In each of said screw holes is an Allen-type screw having substantial strength and number of threads to provide great holding power and great force to be exerted against the corner of the square tubing mounted within the square coupling.

---

The present application is an improvement of applicants' co-pending application Ser. No. 701,184, filed Jan. 29, 1968.

The present invention relates to universally adjustable couplings for connecting structural members of load-resisting structures made of thin-walled, square tubing and, more particularly, to load-supporting structures constituted of vertical, horizontal and inclined tubular structural members made of thin-walled, square tubing and connected with novel square, non-twistable, and universally adjustable couplings.

It is well known in the art that round slip-on, set-screw fittings originated abroad, particularly for use in the agricultural field. Slip-on fittings replaced old threaded fittings which had the disadvantage of having to be threaded with dies, etc., and which were too complicated and too sensitive to foreign matter, sand, etc. Generally speaking, scaffolds or similar structures were constructed with heavy round cylindrical pipe which were connected together by means of heavy round couplings. In their simplest forms, they consisted of heavy round cylindrical members of greater bore than the external diameter of the heavy round pipe and only one screw was inserted in the coupling to contact the wall of the round pipe. The real holding of the horizontal round pipe is effected by a tilting action which causes binding as well known in the art. Difficulty was encountered in the sale and the use of heavy European round fittings in the United States and Canada because European round pipe was oversize in relation to American and Canadian round pipe. As a result, the European round fittings were oversize and made a loose fit on the American and Canadian round pipe. They did not fit correctly and they were on the borderline of being safe and secure. Consequently, a serious problem was involved in ensuring heavy round pipe, particularly in horizontal positions, remaining safely and securely in the round fittings or couplings. It was also found as a result of experience that, in order to provide reasonably good strength and efficiency, the round pipes had to be made of heavy material and only steel pipe could be safely used as the force of a plain set screw on any light-walled pipe would spring it and it would be insecure. The fitting was only to be depended upon for holding power when some extended leverage weight was permitted on the structural pipe member at right angles to cause it to jam or lock on the round pipe. And, an even greater problem was involved in preventing axial or rotary slipping. Since both the fitting and the pipe were round, they slipped very easily in an axial or rotary manner. When square tubing appeared on the market various atempts were made to join it. Difficulty was encountered in joining the square tubing as welding was the only popular and well-known method of making the joints. The art experienced trouble in welding thin wall square tubing owing to the liability of burning through the metal. It was found that it was impractical, if not impossible, to weld thin wall square tubing. Although attempts were made to overcome the foregoing difficulties and other disadvantages, none, as far as we are aware, was entirely successful when carried into practice commercially on an industrial scale.

It has now been discovered that the present novel square, non-twistable, and universally adjustable coupling possessing versatile adjustability and having multiple set screws in a strong diagonal rib or ridge and especially adapted for connecting square, thin-walled tubing has provided the art with new and improved results. The square, universally adjustable coupling is not too expensive to manufacture, is lighter in weight than anything previously known, and is capable of giving greater safety and security to load-resisting or load-supporting structures. The adjustable feature of the new adjustable coupling is important as it makes it possible to adjust the components of the novel adjustable coupling to any angle within a 360 degree range. The components may comprise hollow or tubular members of square or polygonal cross section. Each component is provided with means which mate and interlock with corresponding means of another component. Two or more components are used in each adjustable coupling. Usually, only two or three components are required for most practical situations in commerce and industry as will be explained more fully hereinafter. By using a plurality of Allen-type screws in the strong diagonal rib or ridge on each component of the new square, universally adjustable coupling, which are provided with cutting edges at the bottom of each Allen screw, they are capable of cutting, digging and penetrating into the corner of mounted square tubing and locking the same in the new square, universally adjustable coupling. The plurality of Allen set screws are distributed along the strong diagonal rib or ridge of the square adjustable coupling to develop a uniform force against the mounted tubing and to develop at least 50% frictional holding power between the exterior of the square tubing and the interior of the square adjustable coupling. For preventing the displacement of the square tubing in the square adjustable coupling, an internal block or shoulder is incorporated internally at approximately the mid-section of the adjustable coupling. Due to the longer length of the novel square, non-twistable and universally adjustable coupling, a much better fit can be developed with square tubing and a longer coupling area made available for multiple Allen screws avoids any substantial deflection in the horizontal joining of the structural tubular members. As the market for modern square tubing is expanding continuously and the sizes and gauges of the tubing are being offered in greater variety, the novel square, non-twistable and universally adjustable coupling possessing great utility has very broad use. The new square, universally adjustable couplings can be made in a variety of sizes capable of connecting modern square tubing and are practical and economical in preferable commercial sizes varying from approximately one inch O.D. to four inches or so. The markets where the novel square, universally adjustable couplings can be used are practically without limit provided the size of the coupling and the size of the wall thickness of tubing are properly calculated for good strength to make safe and secure load-resisting or load-supporting structures.

It is an object of the present invention to provide a universally adjustable square coupling for connecting structural members of a load-resisting or a load-supporting structure comprising thin-walled, square tubing.

Another object of the invention is to provide a universally adjustable square coupling for connecting structural members of a load-resisting or a load-supporting structure constituted of a plurality of vertically-arranged square tubular members, a plurality of horizontally-arranged square tubular members and/or a plurality of inclined-arranged square tubular members which are safely and securely joined together by means of the novel adjustable and non-twistable couplings.

The invention also contemplates providing a novel square, non-twistable, and universally adjustable coupling universal adjustability and adapted to connect thin-walled, square tubing and having a rugged, strongly-reinforced rib or ridge extending diagonally along one corner of the coupling.

It is a further object of the invention to provide a novel square, non-twistable, and universally adjustable coupling for joining thin-walled, square tubing arranged at any angle with respect to each other and having a rugged, strong diagonal rib or ridge on one corner provided with a plurality of screw holes having a sufficient number of threads to provide strong holding power.

The invention further contemplates providing a novel square, non-twistable, and universally adjustable coupling comprising a plurality of components arranged at any desired angle with respect to each other for connecting thin-walled, square tubing and each component having a strong diagonal rib or ridge on one corner provided with a plurality of Allen-type screws having substantial strength and number of threads to give great holding power and great force to be exerted against the corner of the square tubing mounted within each square component.

It is another object of the invention to provide a novel square, non-twistable, and universally adjustable coupling provided with an auxiliary insert and having a strong diagonal rib or ridge on one corner of each component containing a plurality of Allen-type screws provided with a pin at the end of each screw and adapted to fit into and penetrate a hole or aperture in the wall of the squared corner of the auxiliary insert to ensure a locked joint of great safety and security.

Still another object of the invention is to provide a novel square, non-twistable, and universally adjustable coupling comprising a plurality of components having a strong diagonal rib or ridge on one corner provided with a plurality of Allen-type screws capable of forcing mounted square tubing directly or via an auxiliary insert, uniformly and evenly against the two opposing walls of the adjustable coupling to develop great frictional forces and great holding power between contacting surfaces.

Among the further objects of the present invention is the provision of a novel square, non-twistable, and universally adjustable coupling capable of connecting square tubing safely and securely without axial or rotary slipping and without sections of the tubing escaping from the adjustable coupling.

Other objects and advantages of the invention will become apparent from the following description taken in conjunction with the accompanying drawings, in which:

FIG. 1 illustrates a perspective view of one component of the improved universally adjustable coupling;

FIG. 2 is a perspective view of the two components joined together and embodying the present invention;

FIG. 3 represents a fragmentary detail view, in section of the connection between the two components joined together and illustrated in FIG. 2;

FIG. 4 is a view similar to FIG. 1 of the component with the adjusting and connecting means shown at the lower part of one face of the component;

FIG. 5 depicts a perspective view of a three component coupling embodying the present invention;

FIG. 10 illustrates a modified embodiment of the invention which is useful in situations requiring accentuated holding power;

FIG. 11 is a perspective view, partly broken away and in section for clarity, of an auxiliary insert used in the modified embodiment of the invention illustrated in FIG. 13;

FIG. 12 depicts a special type of Allen screw in perspective which is used to hold the auxiliary insert effectively against the tubing and the tubing against the interior walls of the universally adjustable coupling;

Figure 6:
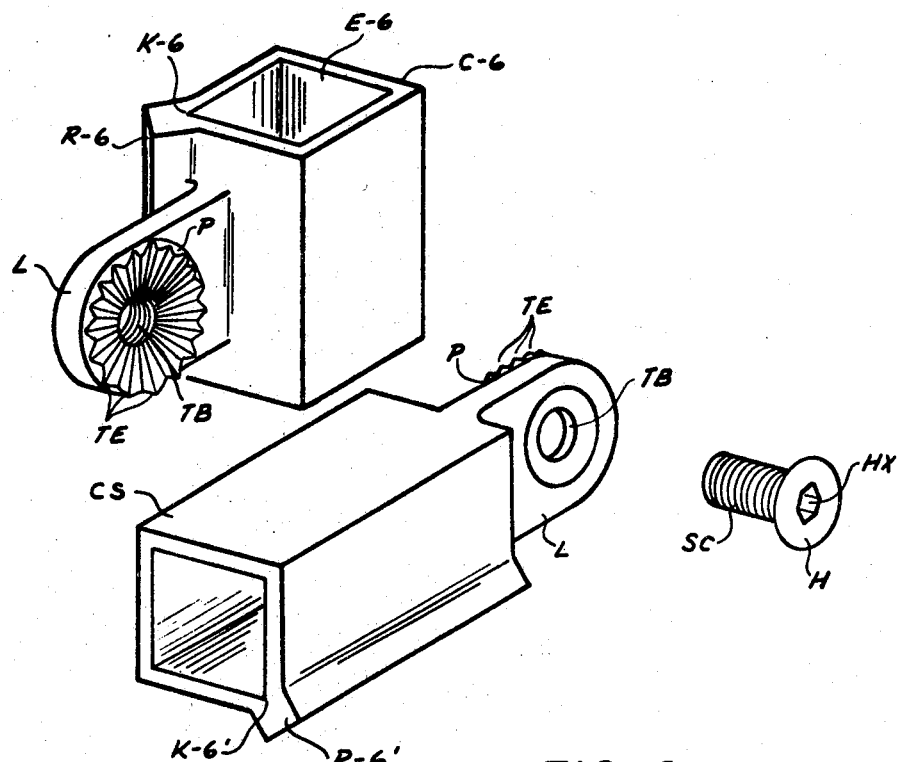
FIG. 6 illustrates an exploded view in perspective of a modified embodiment of the present invention.

Accordingly, the prerent invention relates to a universally adjustable coupling for connecting multi-faceted structural elements in a structure capable of carrying loads and/or resisting stresses. Generally speaking, the universally adjustable coupling comprises a hollow or tubular connecting member, preferably of square cross section with at least two open ends. Each open end in the connecting member is adapted to receive a structural element or member constituted of tubing. A longitudinally extending ridge, rib or flange is located on an exterior corner of the connecting member adjacent each open end. It is preferred to extend the ridge, rib or flange along the entire side. Means are provided to extend through the flange or the like and are adapted to engage a corner of an associated structural element or member. By so doing, a binding action is effected between the interior surfaces of the hollow or tubular connecting member and the exterior surfaces of a structural element or member, such as tubing. Likewise, means are associated with the hollow or tubular connecting member for detachably securing the latter to another hollow or tubular connecting member whreby these members can be adjusted in any angular position with respect to one another, i.e., any angular position within a range of 360 degrees.

Referring to FIG. 1, a component of the present universally adjustable coupling is generally indicated by the reference character C-1. It comprises a hollow or tubular connecting member T-1 which has open ends E-1 and E-1'. The connecting member T-1 can be molded from any suitable material such as, for example, a plastic or a metal or the like. The material selected possesses suitable properties including strength, weight, and the like, depending on the nature and role of the structural elements to be coupled and the nature and role of the service of the universally adjustable coupling.

A longitudinally-extending rib, ridge or flange R-1 is provided on at least one exterior corner K-1 of the coupling member C-1 and the rib, ridge or flange, preferably extends the entire distance between the open ends E-1 and E-1'. If desired, the rib, ridge or flange can be made of two parts, i.e., there can be a separate rig, ridge or flange adjacent each of the open ends. Each rib, ridge or flange, as shown in FIG. 2, has at least one threaded bore B for receiving a screw S and preferably has two or more bores and operatively associated screws. The screws are preferably Allen screws with a hexagonal inset for a standard key or wrench. A stop member SM can be provided on an interior wall of the connecting member C-1. Such a stop member is shown as dashed lines in FIG. 1. The stop member can be located at a suitable distance from the open ends of the connecting member or close to one of the open ends.

Each connecting member is also provided with a projection P for detachably securing the member C-1 to another member C-2, as shown in FIG. 2. Each projection P preferably has such a construction that it can be adjusted in any degree within 360 degrees with respect to its mating projection and attached and safely secured in the adjusted position. It is preferred to construct each projection in the form of a circular gear having radially extending teeth TE defining an annulus or circular projection on its exterior surface of each connecting member as shown in FIG. 1. A large threaded bore TB is located at its center for receiving a large screw thereby making it possible to detachably and safely secure connecting members together in any desired adjustable position. A strong connecting screw SC extends through the bore TB with a head H of the screw being located within a connecting member as shown in FIG. 3. An access aperture A is provided in a wall of a connecting coupling member opposite a projection P and aligned with a bore TB to provide access to the head H of the screw SC.

When the connecting members are used, they are arranged in any angular relationship with respect to each other. For instance, they may be arranged at right angles (90°) to each other as illustrated in FIG. 2. Such an arrangement may be effected by inserting an Allen key handle through aperture A to engage the head H of the screw SC and thereby loosen the latter. The mating projections and their associated teeth can then be rotated until the members are adjusted in the desired angular position. The strong screw SC is then tightened so that teeth TE of one projection firmly engage the teeth of an associated projection and the universally adjustable coupling is ready for use in connecting square tubing of a load-supporting and/or load-resisting structure. Of course, the two connecting members can be adjusted in any angular position with respect to one another and can encompass any desired number of degrees between each other.

Square tubing to be connected is inserted into the open ends of the connecting members. When the sections of the tubing are intended to extend through the connecting members, then the stop member or shoulder or block is not provided in a member. On the other hand, when an end of tubing is to terminate in a connecting member, then a suitable stop member or shoulder or block can be provided at a suitable place on an interior wall of a connecting member. By tightening the Allen screws S to engage an exterior corner of the tubing, a binding action between the interior surfaces of a connecting member and the exterior structural surfaces of the tubing can be effected. Under certain circumstances, the use of self-boring Allen screws permits the Allen screws to penetrate the surfaces of the tubing, thus assuring a safe and tight connection.

Referring to FIG. 5 of the drawings, there are shown three connecting members C-3, C-4 and C-5 similar to connecting member C-1 of FIG. 1. The connecting members C-3, C-4 and C-5 are connected together at various angles. Thus, connecting members C-3 and C-4 are connected together at right angles (90°) to each other. However, the angle between the longitudinal axis of the connecting members C-4 and C-5 can readily be varied to any angle between 0° and 180° in the manner described hereinbefore. They are shown at approximately 45°.

A modified embodiment of the invention is shown in FIG. 6. A connecting member C-6 has a lug L projecting therefrom. The plane of the lug is arranged at an angular disposition of 90° to the exterior wall of the connecting member. The lug has a threaded bore TB' in the center and concentric therewith is an annular projection P having radially-extending teeth TE. On one corner, the projecting rib, ridge or flange R-6 is provided with bores for Allen screws for attaching the connecting member C-6 and an associated structural tubing. Associated with the connecting member C-6 is a connecting socket CS which may have approximately the same size as connecting member C-6. At the closed end of the connecting socket CS is a lug L having a toothed projection P similar to that on lug L of connecting member C-6. One lug has a threaded bore TB for a connecting screw SC with a head H.

As may be seen from FIG. 6, the connecting socket CS can be coupled to connecting member C-6 by means of the connection of the mating lugs. The inter-engaging teeth of the projections enable the connecting member and the connecting socket to be angularly adjusted with respect to one another in a variety of angular positions. In other words, they are universally adjusted. They can also be locked in an adjusted position by tightening a fastening Allen screw SC inserted in the threaded bore of the projecting lugs.

Figure 7:
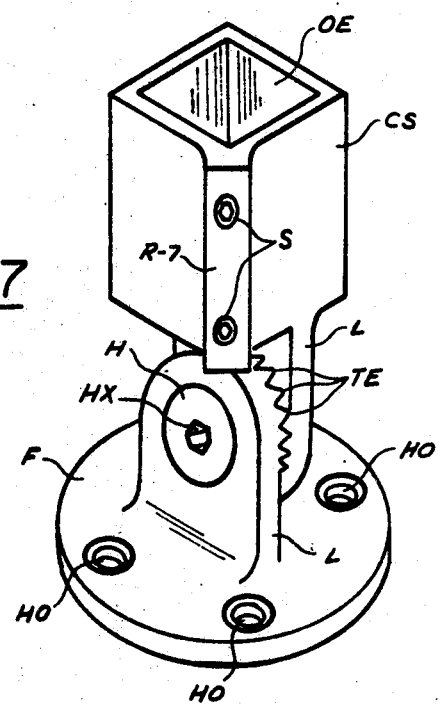
FIG. 7 shows another modified embodiment of the present invention in perspective and in position to be mounted on a horizontal or vertical surface.

In FIG. 7, a flexible anchoring flange is illustrated which is adjustable to all angles on a floor, wall or ceiling or other flat surface. A flange F is shown in a position to be fastened to a floor by means of screws, for example, which can be inserted through holes HO into the floor. Projecting upwardly from flange F at right angles is a lug L. On the far side of the lug is a projection P provided with a plurality of teeth TE.

A connecting socket CS is adjustably fastened to the anchoring flange F by means of a joining or fastening Allen screw. The head H of the connecting Allen screw may be seen in FIG. 7 and can be adjusted with a suitable key handle. Extending downwardly is a lug L at right angles to the bottom of the connecting socket. The square shape of the socket is adapted to hold square tubing in its open end OE. The tubing can be fastened securely in position by screws S in the rib, ridge or flange R-7. While the socket is shown in a vertical upward position, it can be adjusted to any desired angular position. Such adjustments are usually made when the anchoring flange is secured to a wall. Due to the universal adjustability of the improved adjustable coupling, it can be securely locked at any desired angle.

Figure 8:
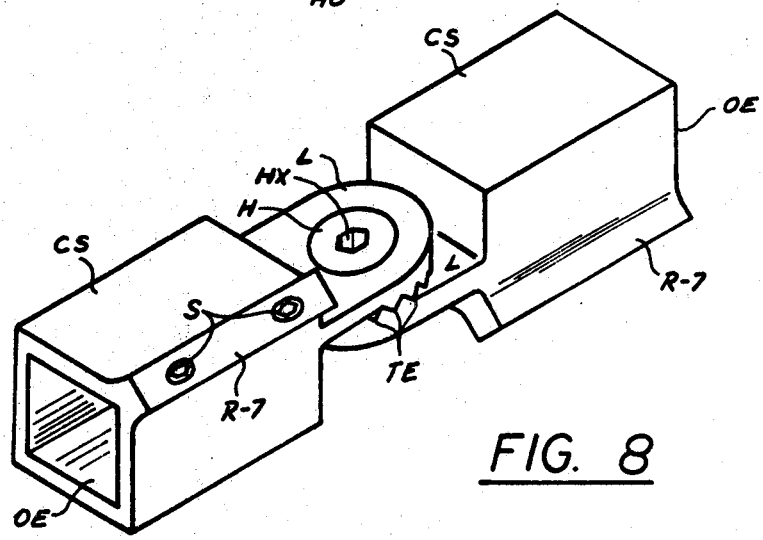
FIG. 8 is a perspective view of a further modification of the present invention adapted to function as a horizontal connector or coupling.

Two connecting sockets CS are shown in FIG. 8 in alignment with each other. The sockets provide a universally adjustable "in-line" coupling. Each socket has a lug L carrying a projection P provided with a plurality of teeth. To hold square tubing securely in the socket, Allen screws S are mounted in threaded bores in a rib, ridge or flange R–8. The tubing slides in an open end OE of the socket. By loosening the connecting screw by means of an Allen key handle in its head, the two sockets can be changed from "in-line" position to any desired angular position.

Figure 9:
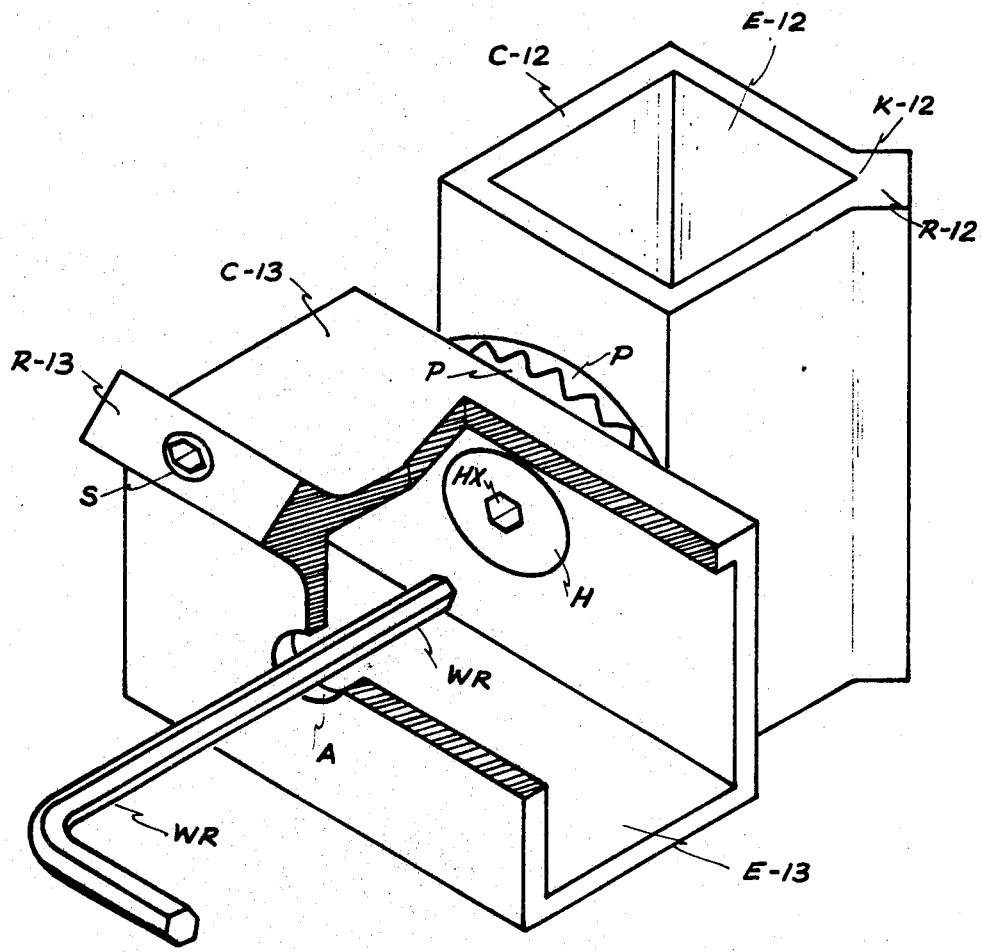
FIG. 9 illustrates a perspective view of an improved adjustable coupling, with parts broken away and depicted in section, to show a tool about to be inserted in the connecting screw.

Referring to FIG. 9, a pair of components C–12 and C–13 are illustrated as being connected together at right angles by means of inter-meshing teeth on projections P. On corners of the components are strong reinforced ribs R–12 and R–13 which project from corners K–12 and K–13. As described heretofore, at least two Allen type screws S are provided in each rib to hold the tubing within the component securely and uniformly. To lock the two components together a tool WR, such as a wrench, screw driver or the like, is put through aperture A and is inserted into the head H of the connecting screw via a hexagonal hole HX. Of course, a slot or other suitable means may be provided on the head of the connecting screw for insertion of the tool. By tightening the connecting screw, the two components can be safely and securely fastened together and can then constitute a universally adjustable coupling.

When it is desired to change the angular relation of the two components, the connecting screw is loosened by the use of the tool and the teeth on the projections are disengaged. The two components can then be reset at a desired angle. The teeth are inter-meshed and the projections are inter-connected. The tool WR can tighten the connecting screw in order to safely and securely join the two components together at the reset angle. In this condition, the locked components can function as a universally adjustable coupling for holding square tubing in a new angular position with respect to each other.

A modified embodiment of the invention is shown in FIG. 10. The two main component parts are similar to those illustrated in FIG. 9. Vertical component C–13 is adjusted at right angles (90°) to horizontal component C–14. The two components are locked together in the adjusted angular position by inter-meshing teeth TE extending from a projection P on each component. In the modified embodiment an aperture for the adjusting wrench or tool is provided on the far wall of the vertical component and cannot be seen in FIG. 10. As in other embodiments, each component has a reinforced ridge, rib or flange R–13 and R–14. In each reinforced ridge extending from a corner of each component, at least two Allen-type screws are provided in threaded bores. One Allen-type screw S is shown in the horizontal component C–14 in a threaded bore B. By providing at least two screws, effective and uniform pressure can be applied to the tubing within the wall and can be forced into frictional contact with the inner interior walls of the component of the adjustable coupling.

It has been discovered that the frictional engagement within the adjustable coupling can be increased and can be made more effective by the use of an auxiliary insert AI. It is illustrated in position within the coupling in FIG. 10 and by itself in FIG. 11. The auxiliary insert is made of a strong material, such as steel, alloy steel, stainless steel or some other strong metal or alloy as will be understod by those skilled in the art. It comprises two walls WA and WB located at right angles to each other and joined at a corner WC as may be clearly seen in FIGS. 10 and 11. A plurality of seats WS are incorporated in each corner WC for the reception or seating of the end of an Allen-type screw illustrated in FIG. 12. In the present illustration, two such seats are provided in the form of apertures or holes as shown in FIG. 11. Two or more seats are always incorporated in the auxiliary insert to insure uniform pressure against the tubing and also the tubing and the inner or interior walls of the adjustable coupling. It is preferred to space the seats in a uniform manner along the conrer WC. In FIG. 11, each seat WS is spaced a substantially equal distance from the end of the auxiliary insert.

It was also found that an auxiliary insert can have its effectiveness increased by providing a roughened surface RS on the inner or inside walls of the insert. The roughened surface can be made in any suitable or appropriate manner well known in the art. For instance, the roughened surface can be made by filing or roughening the inner or inside walls of the insert. Another very convenient way is to knurl the inner or inside walls to form a knurled surface. When it is desired, the frictional properties of the roughened surface can be accentuated by the use of abrasives or abrasive material. Silica or similar abrasive material can be affixed or bonded to the inner walls with an inorganic bonding agent, such as a solution of water glass (sodium silicate) which is utilized in the well-known sand paper art. As an alternative, emery powder can be employed as is customary in making emery cloth. Instead of an inorganic bonding agent, it is also permissible to use an organic agent, such as a plastic or a natural or synthetic resin or rosin well known to those skilled in the art. Other abrasive surfaces can be made by using tungsten carbide particles or other diamond-substitute particles and by using abrasive agents like nickel phosphide. It is likewise possible to bond abrasive particles to a metal surface by copper brazing or the like. A variety of abrasive particles including silica, alumina, carborundum, and carbides, borides, and silicides of chromium, columbium, molybdenum, tantalum, tungsten, vanadium, and zirconium can be utilized. All of these abrasive materials and procedures for affixing or bonding them to a surface are well known and are disclosed in prior patents and prior publications of the prior art. For example, U.S. Patents Nos. 3,024,128 and 3,023,490 disclose a method of making an abrasive surface with tungsten carbide particles on a metal article, sheet, strip, etc., and to the product thereof. By using these abrasive materials, the coefficient of friction can be increased and the frictional resistance or holding power between the inner walls of the auxiliary insert AI and the outer walls of the tubing can be heightened to any desired degree. In this manner, the gripping or locking force on the tubing TU within the adjustable coupling can be accentuated to a degree desired.

By referring to FIG. 10, it will be observed that an auxiliary insert AI is interposed between the vertical and horizontal inner or interior walls of the adjustable coupling and tubing enclosed within the coupling. An Allen-type screw S (see FIG. 12) with a smaller cylindrical end CE extending like a pin from the bottom can be inserted in each threaded bore B in the reinforced ridge R–14. When the screw S reaches the auxiliary insert, the cylindrical end or pin CE fits into a seat WS as may be seen in FIG. 10. By using a wrench or other appropriate tool, each screw can be inserted a suitable distance and can apply pressure evenly and uniformly on the auxiliary insert. In this manner, all of the roughened surfaces would press evenly and uniformly against the tubing TU. In turn, the tubing would be forced against the bottom inner wall of the adjustable coupling as well as the vertical side wall thereof. Ultimately, the screws would assume their final position and would lock the tubing between the roughened surfaces of the auxiliary insert and the inner walls of the adjustable coupling. As those skilled in the art understand, Allen screws with a knurled end with cutting teeth can be used and the aperture or hole in the insert can be enlarged to permit the knurled end to seat properly and to cut or dig into the metal surface of the auxiliary insert while applying pressure to it and forcing it into its final position as described heretofore. The novel construction embodied in the present adjustable coupling would assure safety and security to load-carrying and/or load-resisting structures having structural members which are connected by means of the universally adjustable coupling. All of the above results are obtained without any damage or mutilation to the tube whatsoever.

For the purpose of giving those skilled in the art a better understanding of the invention and/or a better appreciation of the advantages of the invention, the following illustrative examples are given:

EXAMPLE I

Figure 13:
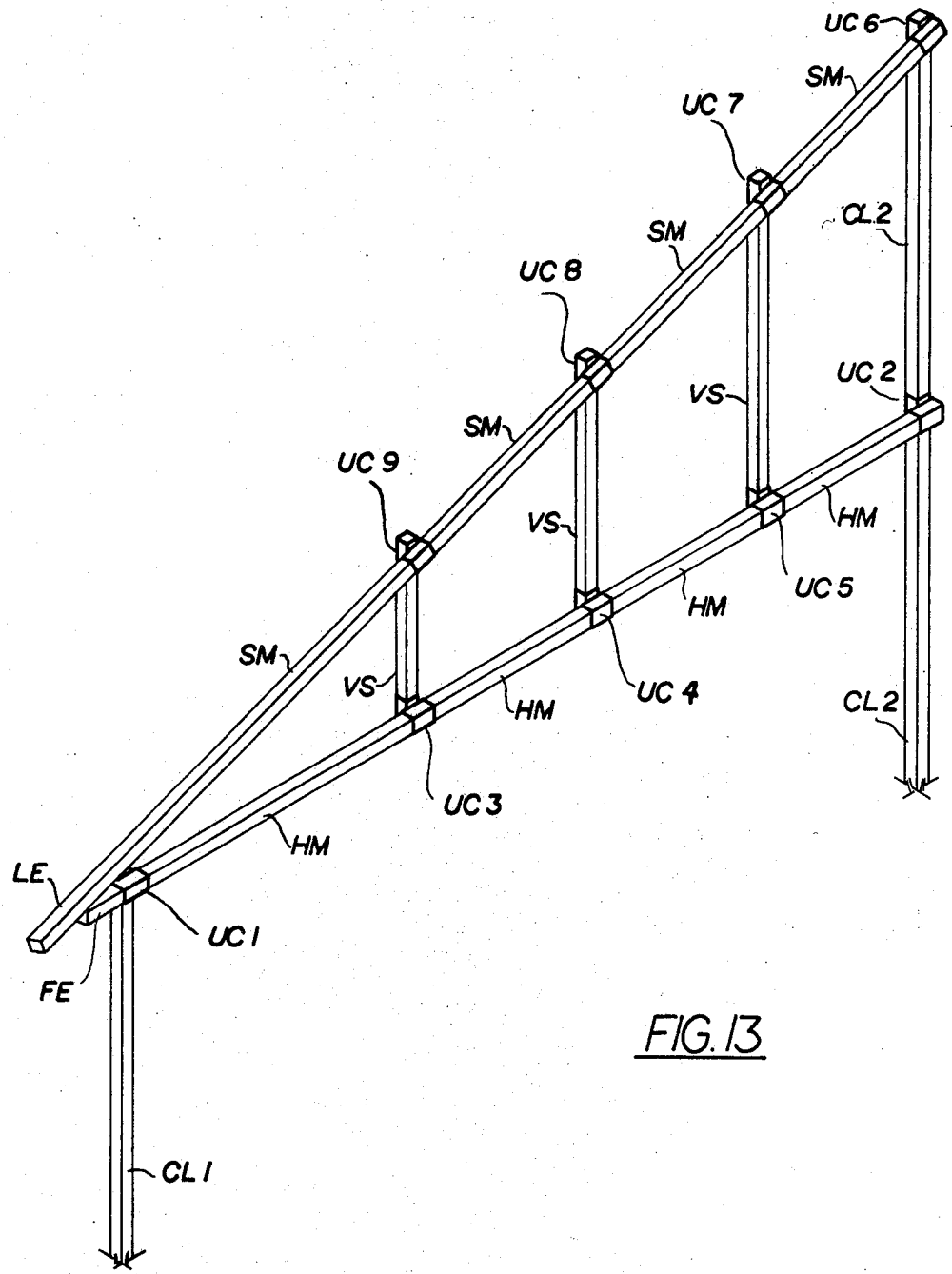
FIG. 13 represents the upper part of a roof truss in perspective with the present universally adjustable couplings connecting verious structural members of the roof truss.

The universally adjustable coupling embodying the present invention can be employed for a great variety of uses. For instance, the upper part of a roof truss is illustrated in FIG. 13 where the novel universally adjustable couplings are used to connect various structural members. A vertical column CL–1 is shown at one end of the roof truss and a second vertical column CL–2 is depicted at the mid-point of the truss and roof. Since a roof truss constitutes a load-carrying and/or a load-resisting structure involving high stresses, it is preferred to use the modified embodiment of the present invention illustrated in FIG. 10. To connect or join column CL–1 to a horizontal member HM, a universally adjustable coupling UC–1 is interposed between them. The two components of adjustable coupling UC–1 are adjusted at right angles (90°) to each other and are then locked in position as described heretofore. Square tubing constituting a column CL–1 is fastened safely and securely in the vertical component of the adjustable coupling by means of a plurality of Allen screws inserted in the reinforced ridge on a corner of the vertical component. On the other hand, the horizontal component carries horizontal tubing constituting the horizontal structural member HM. The tubing is safely and securely fastened in the horizontal component by means of Allen screws as described heretofore in connection with the adjustable coupling illustrated in FIG. 10. By using an auxiliary insert in each component of the coupling, a more effective and a higher holding force can be established within each component. Moreover, by utilizing an abrasive surface on each inner face of the insert, greater holding forces can be developed. Various abrasive surfaces have different coefficients of friction and the higher the coefficient the higher the frictional forces developed and the greater the holding power of the adjustable coupling.

The horizontal structural member HM can extend to the other vertical column CL–2. To connect these members together, an adjustable coupling UC–2 is used. The end of the horizontal tubing is safely and securely fastened in the horizontal component of the coupling with two or more Allen screws in the ridge. On the other hand, the vertical tubing constituting column CL–2 extends through the vertical component to the top of the truss. It is likewise securely fastened in the component by means of two or more Allen screws.

Between the vertical columns, the horizontal tubing passes through a plurality of adjustable couplings. In the present instance, couplings UC–3, UC–4 and UC–5 are employed. These couplings are adjusted so that the horizontal and vertical components are adjusted at right angles (90°) to each other. The tubing is secured by two or more Allen screws in each horizontal component. In this manner, the horizontal structural member is safely fastened throughout its length.

At the top of the vertical column CL–2, an adjustable coupling UC–6 is mounted and is employed to connect the column to a sloped or inclined structural member SM of the roof truss. The components of coupling UC–6 are adjusted at an angle corresponding to the slope or inclination of the sloped or inclined structural member. In the present instance, an angle of approximately 30° is used. The components are adjusted and then locked together. The tubing constituting the vertical column CL–2 and the sloped or inclined structural member are safely fastened within the components by a plurality of Allen screws.

The lower end LE of the sloped member rests upon the front end FE of the horizontal structural member HM. Between the lower end and the top of the sloped member, a plurality of adjustable couplings UC–7, UC–8 and UC–9 are interposed. The number will correspond to the number of vertical struts VS. In FIG. 13, it will be observed that three are shown. As those skilled in the art understand, the number of vertical struts will depend upon the size and span of the roof truss. Each adjustable coupling is adjusted to the inclination of the truss and is then locked in position. As mentioned heretofore, the adjusted angle is approximately 30° in the present illustration. The sloped tubing passes through each coupling and is safely fastened in each one with a plurality of Allen screws. The vertical struts are likewise fastened in the couplings by Allen screws. In this manner, the roof truss is firmly held together and constitutes a strong load-carrying and/or load-resisting strutcure. Upon the top of the truss, cross members or purlins can be secured for holding the roof.

EXAMPLE II

Figure 14:
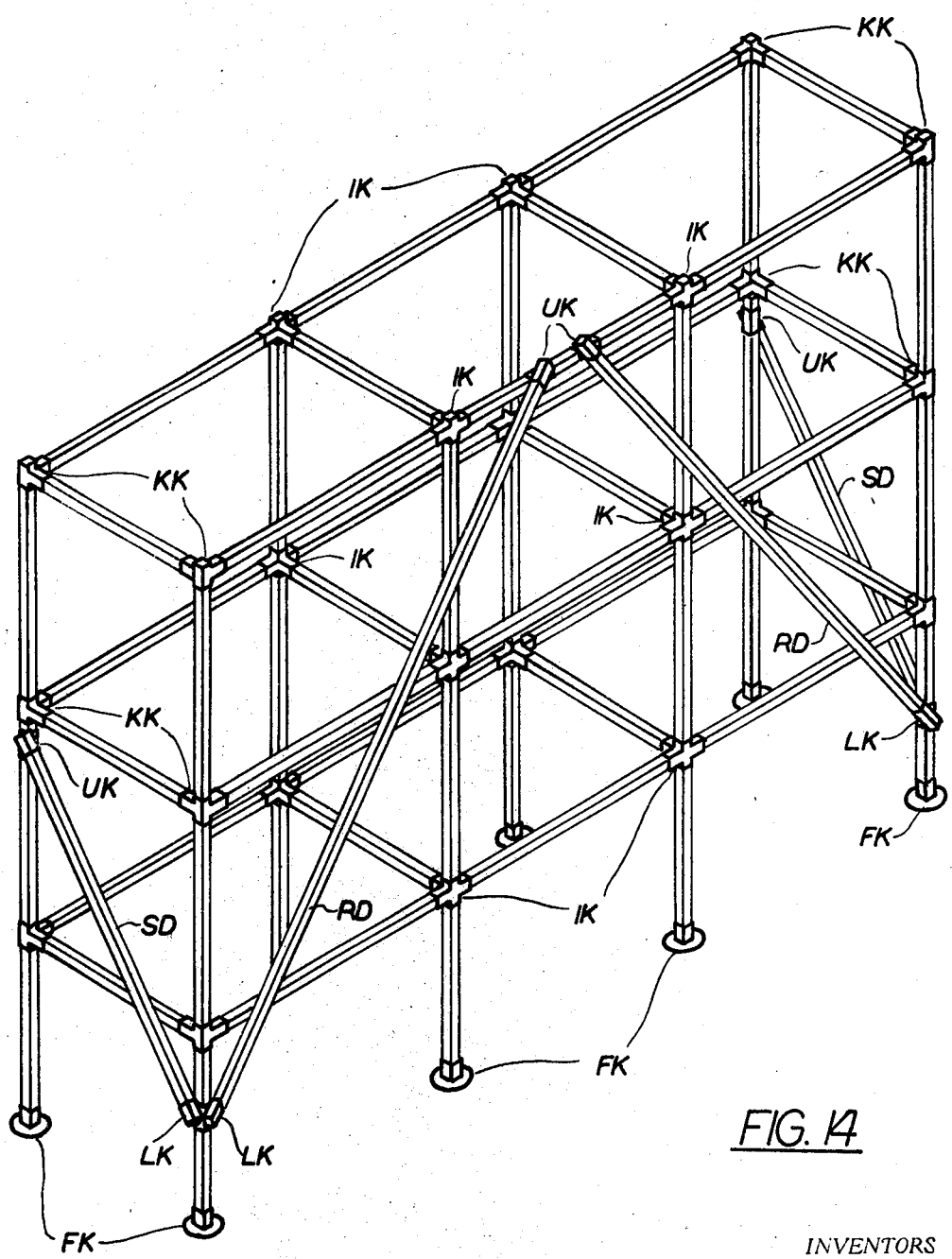
FIG. 14 depicts a perspective view of a storage rack with the present universally adjustable couplings connecting the structural members.

Another example of a load-carrying and/or load-resisting structure which has to sustain high stresses is depicted in FIG. 14. The structure is a storage rack which is designed to carry heavy loads and which is utilized in commercial establishments, warehouses, etc., and in industrial factories, shops, etc., as is well known in the art. Since the storage rack has to sustain heavy loads and resist heavy stresses, it is preferred to use the modified coupling with the auxiliary insert illustrated in FIG. 10. For loads which are moderately heavy, an auxiliary insert with a knurled roughened surface may be used. When the loads are extremely heavy, then it is preferable to provide the roughened surfaces of the auxiliary insert with abrasive material as explained heretofore.

The storage rack illustrated in FIG. 14 is of conventional design. It comprises a plurality of horizontal and vertical structural members which are connected together by couplings. In the present example, the structural members comprise square tubing of steel or some other strong metal or alloy, such as stainless steel or a nickel-copper alloy like "Monel." The couplings are preferably made of the same strong metal or alloy. While these couplings may have any appropriate construction, it is preferred that they embody the invention disclosed and illustrated in our co-pending application (Ser. No. 701,184, filed Jan. 29, 1968). Thus, the flange coupling FK has a construction similar to the one illustrated in FIG. 3 of our co-pending application. Similarly, the corner couplings KK can be like the one depicted in FIG. 5 of the said application and the intermediate couplings IK are of the type depicted in FIG. 8A of the co-pending application. While these couplings could be made like embodiments of the present application, it is more economical to use the fixed and rigid couplings of our co-pending application.

With respect to diagonal stiffening braces SD used to strengthen storage racks with heavy loads, it is preferred to use an adjustable coupling embodying the present invention. Thus, the side diagonal stiffening brace SD on each side of the storage rack is provided with an upper adjustable coupling UK like the type illustrated in FIG. 2 or FIG. 6 of the present application and also with a lower adjustable coupling LK like the type illustrated in FIG. 5. Likewise, the two rear diagonal stiffening braces RD are provided with similar couplings. Thus the upper couplings UK are like those in FIG. 2 or FIG. 6 and the lower couplings LK are like those of FIG. 5. The adjustable couplings are adjusted to the desired angle as explained heretofore and are then locked in the angular position. In the present example, the angle is approximately 60°. The tubing is also fastened in the adjustable couplings by means of a plurality of Allen screws in the manner heretofore described. By using diagonal stiffening braces and the present adjustable couplings, an improved structure is provided.

EXAMPLE III

Figure 15:
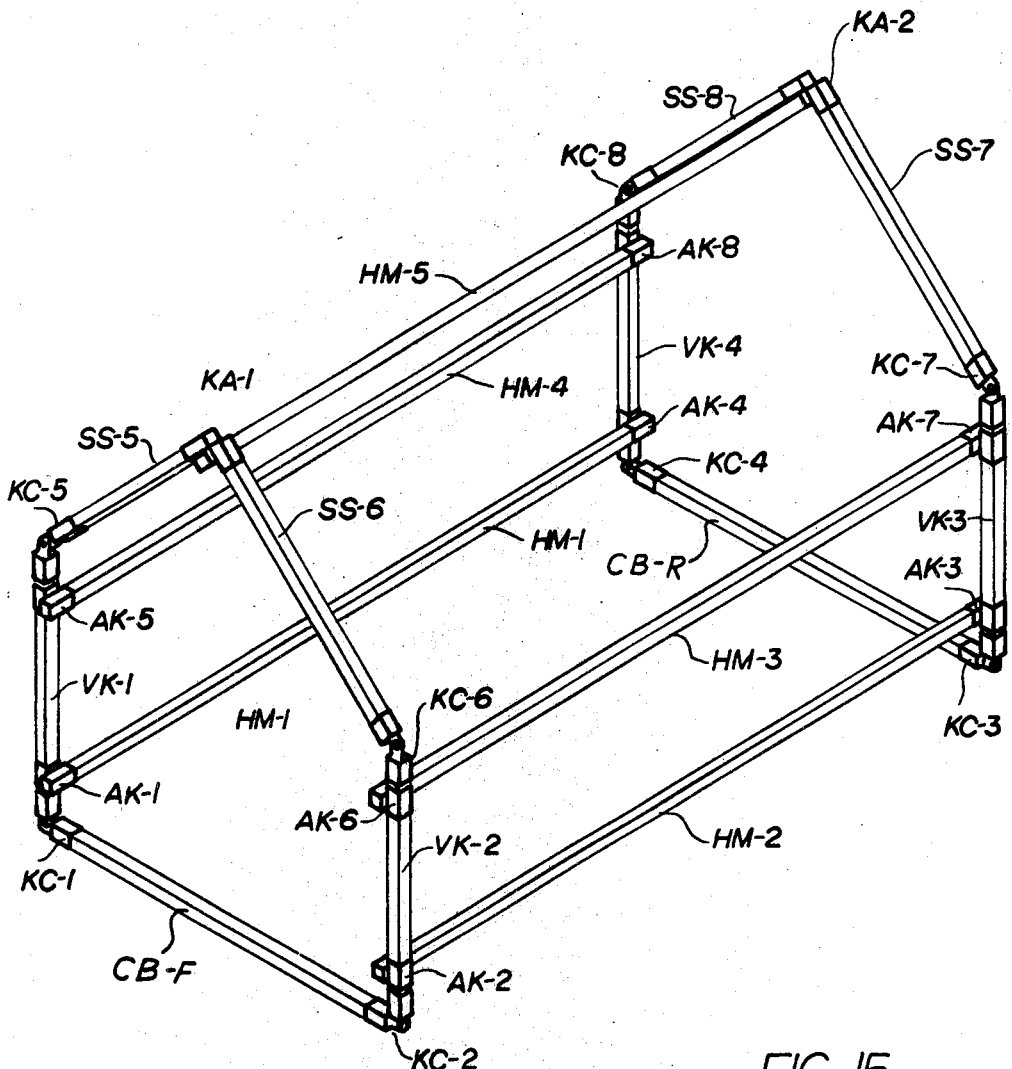
FIG. 15 illustrates a perspective view of a tent frame for supporting canvas to enclose the same.

In FIG. 15, a tent frame is illustrated for supporting canvas or other sheet material well known to the art. The adjustable couplings shown in FIG. 2 and FIG. 6 may be used for connecting the various structural members in the tent frame as may be clearly seen in FIG. 15. Since the loads and stresses are usually low in such tent frames, it is not necessary to use auxiliary inserts in the adjustable couplings.

The front and read of the tent frame comprises "A" structures. Vertical corner columns VK–1, VK–2, VK–3 and VK–4 are mounted in corner adjustable couplings KC–1, KC–2, KC–3 and KC–4. These couplings are preferably of the type shown in FIG. 6. It will be observed that these couplings are adjusted at right angles (90°) and locked in this position. When so adjusted and locked, these couplings will hold a front cross bar CB–F and a rear cross bar CB–R firmly. As clearly shown in FIG. 15, these cross bars rest upon the ground or other surface and support the tent frame.

At the top of each corner column is an adjustable coupling which is adjusted to an obtuse angle to fit the "A" structure. An angle of approximately 120° or so may be used. In accordance with the usual procedure, couplings KC–5, KC–6, KC–7 and KC–8 are locked in the adjusted position of about 120°. From the upper component of each of these couplings, a sloped structural member extends. These members comprise SS–5, SS–6, SS–7 and SS–8. Interposed between the front pair of sloped structural members is three-way A-shaped coupling KA–1. Similarly, a three-way A-shaped coupling KA–2 is interposed between sloped structural members SS–7 and SS–8. The three-way A-shaped couplings are those of the type shown in FIG. 5 and are adjusted to the angle between the sloped members. In the present illustration, the angle is adjusted to approximately 90° or so.

To hold the front and rear "A" frames, a plurality of horizontal members HM–1, HM–2, HM–3 and HM–4 are provided. For the purpose of connecting the horizontal members to the vertical columns, adjustable couplings AK–1, AK–2, AK–3, AK–4, AK–5, AK–6, AK–7 and AK–8 are provided. These couplings are of the type shown in FIG. 2 and adjusted to 90° or right angles. Tubing is fastened in the couplings in the usual manner with a plurality of Allen screws as described in connection with the coupling illustrated in FIG. 2.

A top horizontal member HM–5 acts as a ridge pole for the tent frame and is connected to the front and rear "A" frames via three-way couplings KA–1 and KA–2. These couplings are of the type shown in FIG. 5 and described heretofore. To fasten the front end of the top horizontal member to three-way coupling KA–1, a plurality of Allen screws are used. Similarly, the rear end of the top horizontal member is fastened to three-way coupling KA–2, by means of a plurality of Allen screws in bottom component of the coupling.

When all of the adjustable couplings are locked and when all of the tubing is fastened safely and securely, the tent frame constitutes a stable tent frame. Canvas or other suitable sheet material can be stretched over the tent frame and can form a strong tent capable of resisting rains, storms and winds. By using square tubing made of aluminum or stainless steel, a rust-proof and corrosion-resistant structure is provided. When aluminum or stainless steel is used for the tubing, the adjustable couplings should also be made of aluminum or stainless steel. As those skilled in the art understand, the size of the tubing can be selected according to the size of the tent. For ordinary purposes, square tubing having one inch or two inches on a side may be employed. Naturally, great big tent frames may employ large tubing, say three inches or so on the side and appropriate wall thicknesses.

EXAMPLE IV

Figure 16:
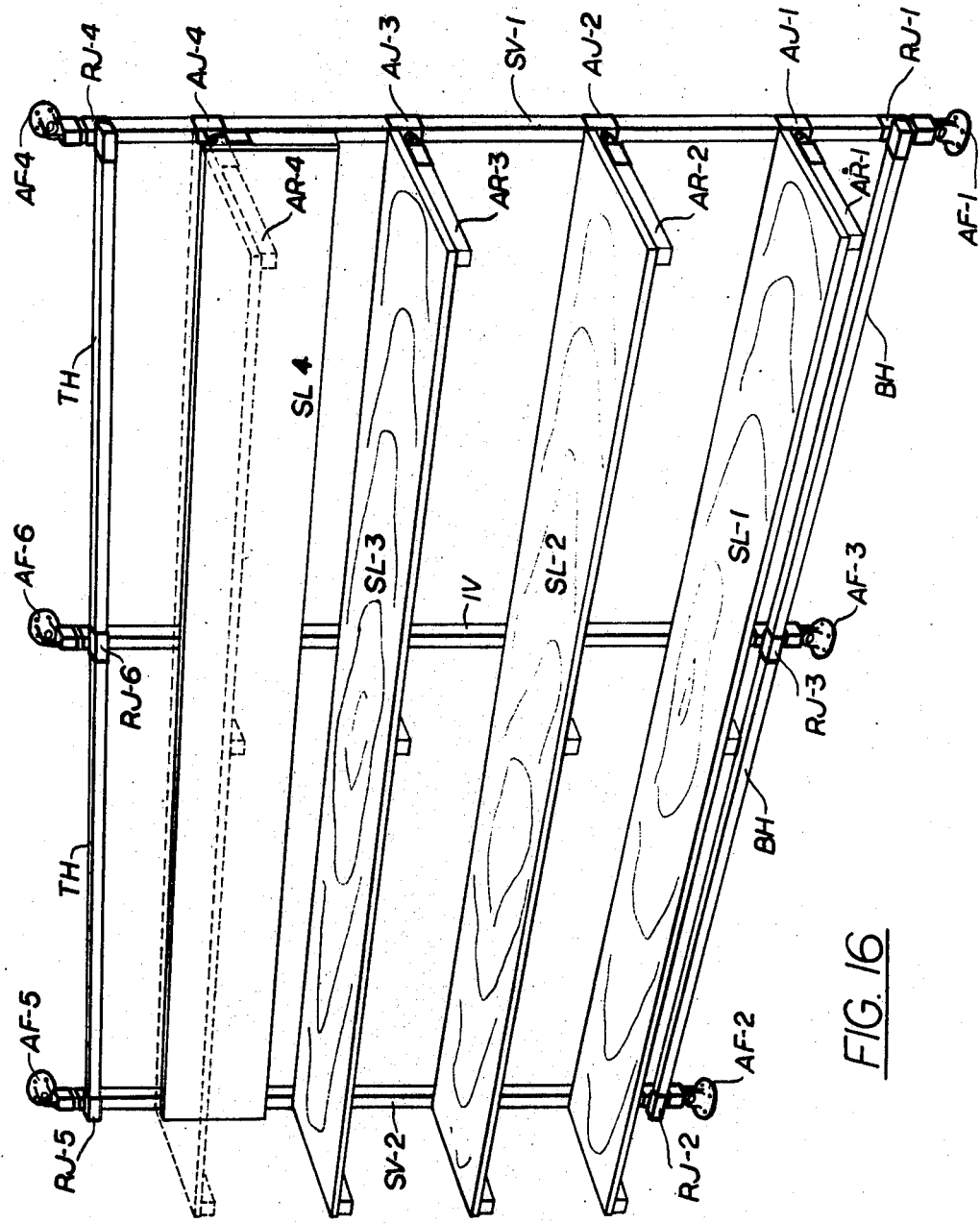
FIG. 16 is another perspective view showing the present universally adjustable coupling connecting structural members of a display stand.

A display stand is depicted in FIG. 16 which is adapted to hold a plurality of shelves for displaying merchandise. On one side of the display stand is a side vertical column SV–1 and on the other side is vertical column SV–2. Between the two sides, an intermediate vertical column IV is provided. At the bottom of each column is a flexible anchoring flange. Under one side vertical column SV–1 is an anchoring flange AF–1 and under the other wide vertical column SV–2 is an anchoring flange AF–2. Similarly, anchoring flange AF–3 is at the bottom of intermediate vertical column IV. Each anchoring flange is adjusted so that the lug on the flange is in alignment with the lug on the connecting socket. The flange can be screwed or bolted or otherwise secured to the floor in a conventional manner.

The top of each vertical column has an anchoring flange attached thereto. Thus, side vertical column SV–1 has anchoring flange AF–4 connected thereto. This flange is fastened to the wall and the connecting socket is secured to the top of the tubing constituting the side vertical column. The anchoring flange is illustrated in FIG. 7 but the connecting socket and flange are adjusted at 90° to each other and are locked in this position. Fixed to the top of the other side vertical column SV–2 is anchoring flange AF–5. It is fastened and secured just like flange AF–4. Similarly, anchoring flange AF–6 is mounted on the top of the intermediate vertical column IV and is adjusted at 90° like the two other anchoring flanges.

In the present illustration, four shelves SL–1, SL–2, SL–3 and SL–4 are shown. Of course, as many shelves can be used as desired. Each shelf is supported by arms AR–1, AR–2, AR–3 and AR–4 projecting from the vertical columns. These arms are joined to the vertical columns by means of adjustable couplings AJ–1, AJ–2, AJ–3 and AJ–4 and corresponding couplings which cannot be seen because of the shelves. These adjustable couplings are like the one illustrated in FIG. 6. As may be clearly observed, the connecting socket is at 90° to the vertical component and the lugs are in alignment with each other. In some situations, the top shelf may be folded downwardly and then the lugs are adjusted and locked at 90° to each other.

For the purpose of strengthening the display stand, a bottom horizontal structural member BH and a top horizontal structural member TH are employed and are joined to the vertical columns. It is preferred to utilize the adjustable couplings illustrated in FIG. 2 and FIG. 9. Right-angle adjusted couplings RJ–1, RP–2 and RJ–3 are connected to the bottom horizontal member and couplings RJ–4, RJ–5 and RJ–6 are connected to the top horizontal member. The square tubing constituting vertical columns and the horizontal members is fastened in each coupling by means of a plurality of Allen screws inserted in the components of each coupling as described more fully in connection with the description of FIG. 2 and FIG. 9.

The present invention can be embodied in a great variety of couplings. Different embodiments are illustrated in the drawings. Thus, the figures illustrate universally adjustable couplings embodying the principles of the invention. A universally adjustable coupling comprises an elongated tubular connecting member which may be longer than conventional ones. For the purpose of connecting square tubing having about 1 or 2 inch O.D., a length of about 4 to 6 inches in a tubular member has been found to give satisfactory service. The ends of the tubular member terminate in open ports for receiving the ends of square tubing mounted within the universally adjustable coupling. The I.D. ("inside diameter") of the universally adjustable coupling is a little larger than the O.D. ("outside diameter") of the square tubing and the latter can be slid into the former thereby forming a convenient sliding joint. A rugged, strongly reinforced ridge, rib or flange extends diagonally from an exterior corner of the universally adjustable coupling. The rugged reinforced ridge is preferably formed integral with adjacent walls of the tubular member. A convenient manner of effecting such construction is by casting the universally adjustable coupling as an integral unit as well understood by those skilled in the art. It is preferred to extend the rugged ridge longitudinally along the entire corner thereby imparting great strength to the ridge. Generally speaking, the width and depth of the ridge should be several times the thickness of the wall of the universally adjustable coupling. For example, a universally adjustable coupling having about a 1 inch I.D. with a wall thickness of about one-eighth (⅛) of an inch is preferably provided with a rugged reinforced ridge having a width of about three-eighths (⅜) of an inch and a depth of about the same amount. Such a rugged ridge has a plurality of threaded bores incorporated therein. It is preferred to have an even number of bores, such as 4 bores. With larger sizes of universally adjustable couplings, 6 or 8 or 10, or so, bores can be used. In each bore, an Allen-type screw is provided. As is well known, a key wrench with an appropriately shaped end, such as a hexagonal end, can be employed to insert or withdraw an Allen-screw from a bore. By spacing the Allen screws suitable distances from each other, they can apply a substantially uniform pressure or force to the corner of the mounted tubing. It has been found that at least two screws must be used in connection with each end of a tubing. For larger size tubing, a plurality of Allen screws, such as more than two, must be used. Thus, for a 2 inch O.D. tubing at least 3 Allen screws should preferably be used, a 3 inch O.D. tubing at least 4 Allen screws should preferably be used, and a 4 inch O.D. at least 6 Allen screws should preferably be used. In this manner, a total of at least 6 Allen screws is used in a 2 inch universally adjustable coupling, at least 8 Allen screws in a 3 inch universally adjustable coupling, and at least 12 Allen screws in a 4 inch universally adjustable coupling. In other words, the present invention provides a novel multi-screw, universally adjustable coupling.

For the purpose of properly aligning the tubing in the novel universally adjustable coupling, a shoulder, block or stop member (not shown) projects internally and perpendicularly from an interior wall of the tubular member. The ends of the tubing are properly positioned within the tubular member by the shoulder and are located at approximately the middle or center of the universally adjustable coupling. In other words, the ends of the tubing are equidistant from the entrances to ports. When the Allen screws are tightened to engage an exterior corner of the tubing, uniform pressure and force can be applied and a safe and secure connection can be made.

In the event that the lengths of tubing are to pass into and through the novel universally adjustable coupling without terminating at the mid-point, the stop member or shoulder is omitted. The interior wall of the universally adjustable coupling is smooth so that tubing can be passed freely into and through the coupling without stopping at a fixed position at the middle or center of the coupling. The Allen screws can be inserted in the usual manner in order to fastened the tubing safely and securely.

The novel square, non-twistable, and universally adjustable coupling is especially adapted for manufacturing by casting. The various figures in the drawings illustrate different types of couplings which can be cast and which can embody the present invention. A variety of metals and alloys can be utilized in making the novel universally adjustable couplings. For instance, aluminum, brass, bronze, cadmium, copper, nickel and nickel-copper alloys, steel, stainless steel and zinc, and alloys of the foregoing metals are suitable for casting and especially for die casting and precision casting. All of the structural parts of the universally adjustable coupling can be cast as an integral unit possessing high strength and other desirable properties. The selection of the metal or alloy can be made by those skilled in the art depending upon the conditions of use and the purposes of the load-resisting or load-supporting structure.

The tubular structural members comprise thin-walled square tubing made of an appropriate metal or alloy. It is preferred to use square tubing made of a rust-proof and corrosion resistant metal or alloy, such as aluminum or stainless steel. However, plain and alloy steel or malleable iron can be used provided it possesses adequate properties including high strength and provided it is protected against rusting and corroding. Generally speaking, square tubing having a 2 inch O.D. ("outside diameter") and a wall thickness of approximately 0.035" is suitable for the storage rack in FIG. 14. For other conditions, smaller or larger square tubing can be used. For instance, square tubing having about 1 or 1½ inch O.D. and 0.028" wall thickness can be used where lighter loads are to be accommodated on the load-supporting structure, such as the tent frame, whereas square tubing having about 3 or 4 inch O.D. or so and 0.050" or so wall thickness can be employed where heavier loads are to be supported, such as the roof truss.

It is to be observed that the present invention provides a novel square, non-twistable, and universally adjustable coupling for connecting multi-faceted structural members. The novel universally adjustable coupling comprises a hollow or tubular connecting member of polygonal cross section, preferably square or rectangular, having at least two open ports or ends. Each port or end is adapted to receive a structural member. A longitudinally-extending ridge, rib, or flange is located on an exterior corner of the universally adjustable coupling adjacent each open end. Means are provided to extend through the ridge, rib, or flange and to engage a corner of an associated structural member thereby effecting a high friction binding action between the interior surface of the coupling and the exterior surfaces of the structural members.

Furthermore, the invention provides a novel square, non-twistable, and universally adjustable coupling which is capable of assuming practically any polygonal shape. The polygonal shape preferably involves four sides but may involve more than four sides, such as a pentagon, hexagon, or the like. However, the preferred and most practical polygonal shape has a square or rectangular cross section. Such a shape is preferable for the sake of simplicity and ease of construction. The use of the novel universally adjustable coupling having a polygonal cross section prevents axial failure by slipping or turning of the connected structural members relative to the coupling. The Allen screws or other fastening means safely, firmly, and fixedly secure the sections or portions of the structural members located within the universally adjustable coupling and likewise prevent longitudinal failure by slipping or turning of the sections or portions relative to the coupling. By virtue of the location of the longitudinally-extending ridge, rib, or flange adjacent to each corner of the adjustable coupling, a high friction binding effect will be brought about between the contacting surfaces of the adjustable coupling and the structural members. This novel arrangement prevents the possible collapse or failure of the structure due to axial and/or longitudinal failure by slipping or turning.

Moreover, the invention provides a novel, square, non-twistable, and universally adjustable coupling for connecting multi-faceted structural members which comprises a hollow or tubular connecting member of polygonal cross section with at least two open ends or ports in the connecting member adapted to receive a structural member. A longitudinally-extending ridge, rib, or flange is located on an exterior corner of the novel universally adjustable coupling and preferably extends not only adjacent each open end, but along the entire corner.

Allen-type screws or other appropriate fastening means extend through the ridge, rib, or flange and are adapted to engage a corner of an associated structural member thereby effecting a locking action between the interior surfaces of the adjustable coupling and the exterior surfaces of the structural members. The ridge, rib, or flange includes deeply threaded bores for receiving threaded screws for engaging, binding and/or locking the corner of the associated structural members. The threaded screws of the Allen key or wrench type are preferably provided with self-boring or cutting ends for boring, cutting and digging into the corner of an associated structural member and for penetrating and indenting the wall of the structural member to provide a safe and securely locked or fastened joint.

The present invention contemplates the provision of a novel square, non-twistable, and universally adjustable coupling which can be incorporated in various embodiments. Although the invention has been described and illustrated in connection with certain illustrative embodiments, many other forms can be made and used and such forms include elbow couplings, a four socket cross and other standard couplings well known to the art. The ridge, rib, or flange preferably extends along the entire corner of a coupling, but it can constitute a selected portion of a corner. It must be rugged and strong and must provide deeply threaded bores with strong holding power to enable the screws to apply effective and even pressure against the corner of a structural member in order to effect high frictional resistance between the interior surfaces of the coupling and the exterior surfaces of the structural member. Such high frictional resistance ensures stability and safety of a load-supporting structure.

The present invention also contemplates the provision of a square, non-twistable and universally adjustable coupling made of a metal and comprising at least two square tubular connecting members consisting of four strong walls merging at their sides and forming a hollow square cross section of great strength, said tubular connecting members being detachably and adjustably joined together for relative angular displacement with respect to one another; a projection associated with one exterior wall of each tubular connecting member and provided with intermeshing means arranged through 360 degrees in a circular annulus to mate with similar means of a projection on an adjoining connecting member thereby enabling the square tubular connecting members to assume a plurality of adjustable positions with respect to one another; joining means associated with said square tubular members to lock the same together in adjusted angular positions; and a strongly reinforced ridge extending diagonally from an exterior corner of said merged walls and containing at least two suitably spaced threaded bores provided with Allen-type screws strong enough and capable of uniformly forcing enclosed square tubing against opposing walls to effect high frictional holding power whereby square tubing is safely and securely joined together to form a load-resisting and/or a load-supporting structure without axial slipping.

Likewise, the present invention contemplates the provision of a square, non-twistable and universally adjustable coupling made of a metal of the group consisting of aluminum, cadmium, copper, iron, magnesium, nickel, steel including stainless steel and zinc, and alloys thereof and comprising a pair of square-shaped tubular connecting members having strong walls and detachably and adjustably connected together for angular displacement with respect to one another; a gear-like projection with a plurality of teeth arranged through 360 degrees in a circular annulus and adapted to mate with a similar gear-like projection on an adjoining tubular connecting member thereby enabling the joined tubular members to assume a plurality of adjustable positions with respect to one another; a large Allen-type screw for locking the mating teeth of the gear-like projections of said tubular members together in an adjusted angular position; and a strong ridge extending diagonally from a corner of each square tubular connecting member and containing at least two, suitably spaced, threaded bores and associated Allen-type screws strong enough and capable of uniformly forcing enclosed square tubing against opposing walls to effect high frictional holding power whereby square tubing can be arranged horizontally, vertically, and in any angular position and can be safely and securely joined together to form a load-resisting and/or a load-supporting structure without axial slipping.

Although the present invention has been described in conjunction with the preferred embodiments, it is to be understood that modifications and variations may be resorted to without departing from the spirit and scope of the invention, as those skilled in the art will readily understand. For instance, metals and alloys are the preferred materials for the novel, universally adjustable couplings and the square tubing, but other suitable materials, such as wood and fibrous products as well as plastic and synthetic products having appropriate properties may be used. Likewise, thin-walled tubing is preferred, but the dimension of the wall may be increased in order to sustain the load and/or to withstand the stress to which it is subjected in the load-supporting or load-resisting structure. In special cases, the polygonal tubing may have a heavy wall or may be solid. Variations and modifications such as shown in our co-pending application (Ser. No. 701,184) are within the purview of the foregoing statements and the disclosure of our co-pending application is incorporated herein by reference. Various load-supporting and/or load-resisting structures may embody the present invention and may use the novel square, non-twistable, and universally adjustable couplings including, for example, platforms, mezzanines, and cat walks, drum racks, tailpipe and muffler racks, work-table frames, bar and pipe racks, tire racks, pallet and skid racks, storage racks, rear supports for outdoor advertising signs, small buildings and the like. Such modifications and variations are considered to be within the purview and scope of the invention and appended claims.

We claim:

1. A square, universally adjustable and non-twistable coupling for connecting multi-faceted square structural members in a plurality of relative angular positions, said adjustable coupling comprising a pair of square tubular connecting members detachably and adjustably connected together for relative angular displacement with respect to one another, at least one open end in each of said square tubular connecting members adapted to receive a structural member constituted of square tubing, securing means associated with said square tubular connecting members to lock them safely together in their angular positions, a longitudinally extending ridge located along the entire exterior corner of each of said square tubular connecting members, screw means extending through said ridge and adapted to force a corner of an associated structural member to effect a binding action between the interior surfaces of said square tubular connecting member and the exterior surfaces of a square structural member, and means associated with one of said square tubular connecting members for detachably securing the latter to another square tubular connecting member whereby said square tubular connecting members can assume a plurality of adjustable positions with respect to one another.

2. A square, non-twistable and universally adjustable coupling for interconnecting multi-faceted square structural members in a plurality of angular positions for the support of load-resisting and/or load-supporting structures and the like, said adjustable coupling comprising a pair of tubular bodies of square cross section possessing high strength and detachably and adjustably connected together for angular displacement with respect to one another; a large Allen-type screw fastening said pair of square tubular bodies together in their relative angular positions; at least two open ends in each of said square tubular bodies constituting tubular branches adapted to receive square structural members therein; an internal rib on an interior wall of each of said square tubular bodies intermediate the ends of said aligned branches adapted to position the structural members in each tubular body; a screw-retaining ridge provided on the outside corner of said square tubular body and extending outwardly and diagonally from a corner of a branch so as to bisect the apex of said corner and extending lengthwise of said branch a sufficient distance to accommodate at least a pair of Allen-type screws therein; and at least a pair of Allen-type screws provided in said ridge and adapted when turned inwardly to diagonally force a corner of a structural member so as to jam the exterior planar surfaces thereof against the juxtaposed interior surfaces of said tubular branches.

3. A square, non-twistable and universally adjustable coupling for interconnecting multi-faceted square structural members in a plurality of angular positions for the support of load-supporting and/or load-resisting structures and the like, said adjustable coupling made of a metal or alloy and comprising a pair of tubular bodies of square cross section possessing high strength and detachably and adjustably connected together for angular displacement with respect to one another; a large Allen-type screw fastening said pair of square tubular bodies together in their relative angular positions; a relatively large aperture in a wall of one of said tubular bodies to permit the insertion of a tool to fasten or loosen said large Allen-type screw to fasten and lock the tubular bodies together or to loosen them and free them from each other; at least two open ends in each of said square tubular bodies constituting tubular branches adapted to receive square structural members therein; an internal rib on an interior wall of each of said square tubular bodies intermediate the ends of said aligned branches adapted to position the structural members in each tubular body; a screw-retaining ridge provided on the outside corner of said square tubular body and extending outwardly and diagonally from a corner of a branch so as to bisect the apex of said corner and extending lengthwise of said branch a sufficient distances to accommodate at least a pair of Allen-type screws therein; and at least a pair of Allen-type screws provided in said ridge and adapted when turned inwardly to diagonally force a corner of a structure member so as to jam the exterior planar surfaces thereof against the juxtaposed interior surfaces of said tubular branches.

4. A square, non-twistable and universally adjustable coupling made of a metal and comprising at least two square tubular connecting members consisting of four strong walls merging at their sides and forming a hollow square cross section of great strength, said tubular connecting members being detachably and adjustably joined together for relative angular displacement with respect to one another; a projection associated with one exterior wall of each tubular connecting member and provided with intermeshing means arranged through 360 degrees in a circular annulus to mate with similar means of a projection on an adjoining connecting member thereby enabling the square tubular connecting members to assume a plurality of adjustable positions with respect to one another; joining means associated with said square tubular members to lock the same together in adjusted angular position a relatively large aperture in a wall of one of said tubular bodies to permit the insertion of a tool to fasten or loosen said large Allen-type screw to fasten and lock the tubular bodies together or to loosen them and free them from each other; and a strongly reinforced ridge extending diagonally from an exterior corner of said merged walls and containing at least two suitably spaced threaded bores provided with Allen-type screws strong enough and capable of uniformly forcing enclosed square tubing against opposing walls to effect high frictional holding power whereby square tubing is safely and securely joined together to form a load-resisting and/or a load-supporting structure without axial slipping.

5. A square, non-twistable and universally adjustable coupling made of a metal and comprising at least two square tubular connecting members consisting of four strong walls merging at their sides and forming a hollow square cross section of great strength, said tubular connecting members being detachably and adjustably joined together for relative angular displacement with respect to one another; a projection associated with one exterior wall of each tubular connecting member and provided with intermeshing means arranged through 360 degrees in a circular annulus to mate with similar means of a projection on an adjoining connecting member thereby enabling the square tubular connecting members to assume a plurality of adjustable positions with respect to one another; joining means associated with said square tubular members to lock the same together in adjusted angular positions; a relatively large aperture in a wall of one of said tubular bodies to permit the insertion of a tool to fasten or loosen said joining means to fasten and lock the tubular bodies together or to loosen them and free them from each other; a metallic auxiliary insert having a frictional undersurface provided within the tubular connecting members and adapted to make frictional contact with square tubing mounted within said tubular connecting members; and a strongly reinforced ridge extending diagonally from an exterior corner of said merged walls and containing at least two suitably spaced threaded bores provided with Allen-type screws strong enough and capable of unformly forcing an auxiliary insert and enclosed square tubing against opposing walls to effect high frictional holding power whereby square tubing is safely and securely joined together to form a load-resisting and/or a load-supporting structure without axial slipping.

6. A universally adjustable and non-twistable coupling for interconnecting multi-faceted structural members in a plurality of angular positions in load-supporting and/or load-resisting structures, said adjustable coupling comprising at least two hollow connecting members detachably and adjustably connected together for angular displacement with respect to one another, means operatively associated with said connecting members to lock the same securely together in their adjusted angular position, the said locking means for detachably securing said hollow connecting members in an angularly adjusted position with respect to one another including a serrated projection located on an exterior wall of each member and adapted to mate with a similar serrated projection, an aperture located in a wall of one of said members opposite to the projection to provide access thereto, each of said hollow members having an opening corresponding in cross section to that of the structural members whereby each hollow member may slidably receive one of the structural members, a ridge located at an exterior corner of each hollow member, and means extending through a ridge on each hollow member to secure a structural member within the hollow member thereby detachably securing the structural member in the hollow member.

7. A square, non-twistable and universally adjustable coupling defined by claim 1 which is made of a white cast metal of the group consisting of aluminum, cadmium, magnesium, stainless steel, and zinc, and alloys thereof.

8. A square, non-twistable and universally adjustable coupling defined by claim 1 and having each hollow connecting member provided with a lug projecting from each side thereof and having each lug provided with a serrated projection adapted to mate with a similar serrated projection of the lug of an adjoining connecting member.

9. A square, non-twistable and universally adjustable coupling defined by claim 8 and having the projecting lugs angularly displaced relatively to each other.

References Cited

UNITED STATES PATENTS

| | | | |
|---|---|---|---|
| 1,386,947 | 8/1921 | Quinn | 248—44 |
| 1,486,158 | 3/1924 | Price. | |
| 1,706,215 | 3/1929 | Davidson. | |
| 1,776,656 | 9/1930 | Frederickson | 52—127 X |
| 2,101,317 | 12/1937 | Lemieux | 287—14 |
| 2,233,901 | 3/1941 | Scacchetti | 287—14 X |
| 2,866,658 | 12/1958 | Cummings | 287—58 |

FOREIGN PATENTS

| | | |
|---|---|---|
| 84,736 | 4/1920 | Switzerland. |
| 100,835 | 4/1937 | Australia. |
| 846,381 | 6/1939 | France. |
| 677,347 | 8/1952 | Great Britain. |
| 499,156 | 11/1954 | Italy. |
| 1,349,424 | 12/1963 | France. |

DAVID J. WILLIAMOWSKY, Primary Examiner

A. V. KUNDRAT, Assistant Examiner

U.S. Cl. X.R.

287—189.36